C. H. Corliss,
Governor,
Nº 8,148.  Patented June 10, 1851.
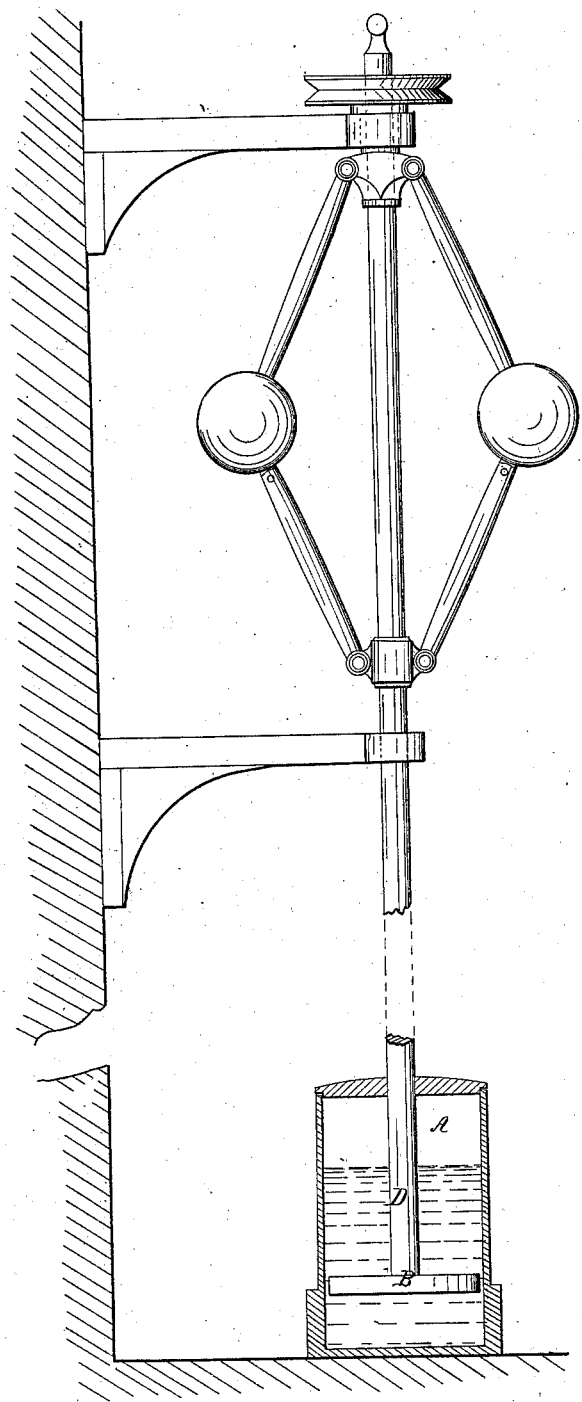

UNITED STATES PATENT OFFICE.

GEORGE H. CORLISS, OF PROVIDENCE, RHODE ISLAND.

GOVERNOR.

Specification of Letters Patent No. 8,148, dated June 10, 1851.

*To all whom it may concern:*

Be it known that I, GEORGE H. CORLISS, of the city and county of Providence and State of Rhode Island, have invented a new and useful Improvement in Governors or Regulators of Motion; and I do hereby declare that the following is a full, clear, and exact description of my said invention, reference being had to the accompanying drawing, which forms part of this specification, and which represents a section of my governor regulator applied to a fly-ball governor.

Governors in general, and particularly the fly-ball governor are subject to a defect which materially affects their efficiency; this defect consists in a tremulous movement, or as it is commonly called fluttering, in moving in either direction from a central or mean point. This fluttering is particularly objectionable in governors applied to steam-engines where the slide of the governor in moving varies the quantity of steam admitted to the cylinder, and where consequently the fluttering of the governor produces a corresponding irregularity in the power exerted by the engine.

The object of my invention is to obviate this defect and it consists of an apparatus which when applied to a governor causes its slide or the equivalent thereof to vary in either direction from a mean point with a regular and equable movement.

This apparatus as represented in the accompanying drawing consists of a cylindrical vessel A which is fitted with a piston B, that moves loosely within it, a narrow annular space *c* intervening between the periphery of the piston and the sides of the vessel. The piston is secured to a piston rod D, which is connected with the slide or other varying member of the governor, so that as the latter rises or falls with changes of speed, the piston is moved in a corresponding manner. When the apparatus is in use the cylindrical vessel is nearly filled with water as represented in the accompanying drawing. If now the slide of the governor be raised by an increase of speed its upward movement is resisted by the water in vessel, which as the piston rises passes around it to fill the space beneath left void by the rising piston; and when the slide of the governor is lowered, its downward movement is also resisted by the water beneath the piston which must be forced around the piston as the latter is lowered. As the space surrounding the piston, through which the water must pass, is narrow, the movements of the piston are necessarily regular for the water cannot move from one side of the piston to the other with sufficient velocity to permit the piston to flutter. As the slide of the governor is connected with the piston, its movement is steadied by that of the piston, and the fluttering motion which has heretofore been so objectionable is done away.

The apparatus I have described may be modified in form arrangement, and construction to suit particular cases or to meet the views of different constructors; thus for example any suitable fluid may be substituted for the water described and the apparatus instead of consisting of a reciprocating piston moving in a cylinder, may take the form of a vibrating piston or paddle moving in a trough containing water, oil or some other fluid.

What I claim as my invention and desire to secure by Letters Patent is—

The method substantially as herein specified of steadying the movement of governors or regulators of motion, by apparatus herein described or the equivalent thereof.

In testimony whereof I have hereunto subscribed my name.

GEORGE H. CORLISS.

Witnesses:
BENJAMIN D. SLAUTON,
THOMAS A. JENCKER.